(12) United States Patent
Flynn

(10) Patent No.: US 6,442,976 B1
(45) Date of Patent: Sep. 3, 2002

(54) LIQUID COOLING OF GLASSWARE MOLDS

(75) Inventor: Robin L. Flynn, Waterville, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/513,049

(22) Filed: Feb. 24, 2000

(51) Int. Cl.$^7$ .................................................. C03B 9/14
(52) U.S. Cl. ............................... 65/265; 65/83; 65/267; 65/319; 65/355; 65/356; 65/357; 65/359; 65/360; 65/361; 65/173; 65/172; 65/171; 249/79; 249/81; 249/111; 249/177; 249/185; 249/139; 249/167; 425/414; 425/468; 425/192 R; 425/526; 425/541
(58) Field of Search ........................... 65/83, 267, 265, 65/319, 355, 356, 354, 357, 359, 360, 361, 173, 172, 171; 249/79, 81, 111, 177, 185, 139, 167; 425/414, 468, 192 R, 526, 541

(56) References Cited

U.S. PATENT DOCUMENTS

| | | | | |
|---|---|---|---|---|
| 1,662,861 A | * | 3/1928 | McLaughlin | |
| 1,798,136 A | | 3/1931 | Barker, Jr. | |
| 1,869,249 A | * | 7/1932 | Gray et al. | |
| 2,365,928 A | * | 12/1944 | Allen | |
| 2,405,475 A | | 8/1946 | Voreaux | |
| 2,483,660 A | * | 10/1949 | Morris et al. | |
| 2,508,891 A | | 5/1950 | Rowe | |
| 2,744,358 A | | 5/1956 | Rowe | |

(List continued on next page.)

FOREIGN PATENT DOCUMENTS

| | | | | |
|---|---|---|---|---|
| CA | 643071 | * | 6/1962 | ................... 65/355 |
| DE | 3123488 | | 11/1982 | |
| EP | 0141288 | | 8/1985 | |
| EP | 0184394 | | 6/1986 | |
| EP | 0612699 | | 8/1994 | |
| EP | 0576745 | | 1/1996 | |
| FR | 2237156 | | 7/1973 | |
| FR | 2346294 | | 12/1975 | |
| FR | 2260076 | | 1/1978 | |
| GB | 2060603 | | 7/1983 | |
| GB | 2256868 | | 12/1992 | |
| WO | 9413594 | | 6/1994 | |
| WO | 9903789 | | 1/1999 | |

OTHER PUBLICATIONS

"Axial Cooling," Owens–Illinois, date unknown.
"The Verti–Flow Mold Cooling System," Emhart, date unknown.
Ductile Iron Data for Design Engineers (1990) p. 134 and 5–1 to 5–18.
Hanrez–Belgium Patent Application (translation) "Molding Structure having Continuously Adjustable Thermal Resistance" (1980).

Primary Examiner—Michael Colaianni

(57) ABSTRACT

A system and method of cooling glassware molds by directing liquid coolant to the blank or blow mold halves of a glassware forming machine through an enclosed pivotal rotary union-type structure. A coolant manifold is carried by each pivotal mold arm, and communicates with coolant inlet and outlet ports at the lower end of each mold part. The manifold is connected by a floating shaft seal and a rotary union assembly and a crank arm to a coolant source and coolant return in the section box of the associated machine section. Each pivotal connection—i.e., between the section box and the crank arm, between the crank arm and the rotary union assembly, and between the rotary union assembly and the floating shaft seal—comprises a bi-directional rotary union for feeding liquid coolant to the manifold and mold parts, and returning coolant from the manifold and mold parts. Dynamic floating seals between the coolant manifold and the mold parts, and between the coolant manifold and the rotary union mechanism, accommodate relative motion between these components as the mold parts are opened and closed.

39 Claims, 13 Drawing Sheets

U.S. PATENT DOCUMENTS

| | | |
|---|---|---|
| 3,094,404 A | 6/1963 | Lauck |
| 3,249,418 A | 5/1966 | Irwin et al. |
| 3,499,746 A | 3/1970 | Blankenship et al. |
| 3,499,776 A | 3/1970 | Baak et al. |
| 3,586,491 A | 6/1971 | Mennitt |
| 3,653,870 A | 4/1972 | Foster et al. |
| 3,731,650 A | 5/1973 | Schweikert et al. |
| 3,838,997 A | 10/1974 | Becker |
| 3,849,101 A | 11/1974 | Wythe et al. |
| 3,887,350 A | 6/1975 | Jenkins |
| 4,070,174 A | 1/1978 | Nebelung et al. |
| 4,104,046 A | 8/1978 | McCreery |
| 4,140,512 A | 2/1979 | Carmi et al. |
| 4,142,884 A | 3/1979 | Jones, Jr. |
| 4,251,253 A | 2/1981 | Becker et al. |
| 4,313,751 A | 2/1982 | Torok |
| 4,361,434 A | 11/1982 | Schneider |
| 4,362,544 A | 12/1982 | Mallory |
| 4,388,099 A | 6/1983 | Hermening et al. |
| 4,490,164 A | 12/1984 | Nebelung et al. |
| 4,561,875 A | 12/1985 | Foster |
| 4,578,104 A | 3/1986 | Jones |
| 4,655,813 A | 4/1987 | Nebelung |
| 4,701,203 A | 10/1987 | Schneider |
| 4,750,929 A | 6/1988 | Bolin |
| 4,824,461 A | 4/1989 | Cavazos |
| 4,842,506 A * | 6/1989 | Coutier |
| 4,842,637 A | 6/1989 | Bolin et al. |
| RE34,048 E | 9/1992 | Bolin |
| 5,167,688 A | 12/1992 | Cavazos |
| 5,304,229 A | 4/1994 | Swanfeld |
| 5,330,551 A | 7/1994 | Bolin |
| 5,364,437 A | 11/1994 | Bolin |
| 5,505,758 A | 4/1996 | Grueninger |
| 5,505,759 A | 4/1996 | Meyer et al. |
| 5,516,352 A | 5/1996 | Bögert et al. |
| 5,656,051 A | 8/1997 | Mares-Benavides |

* cited by examiner

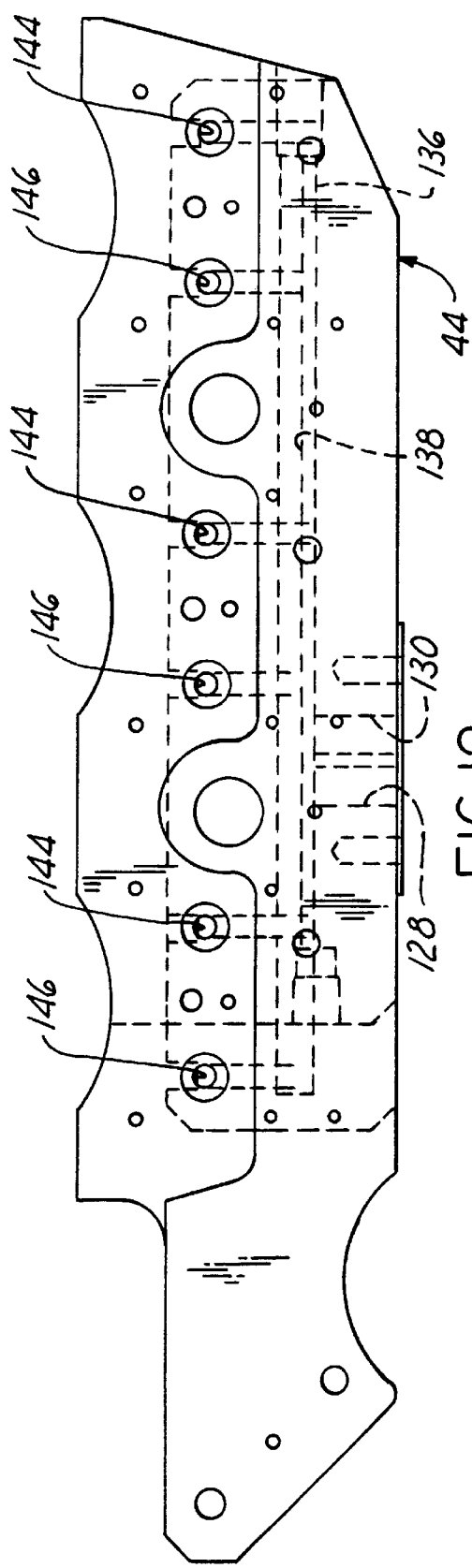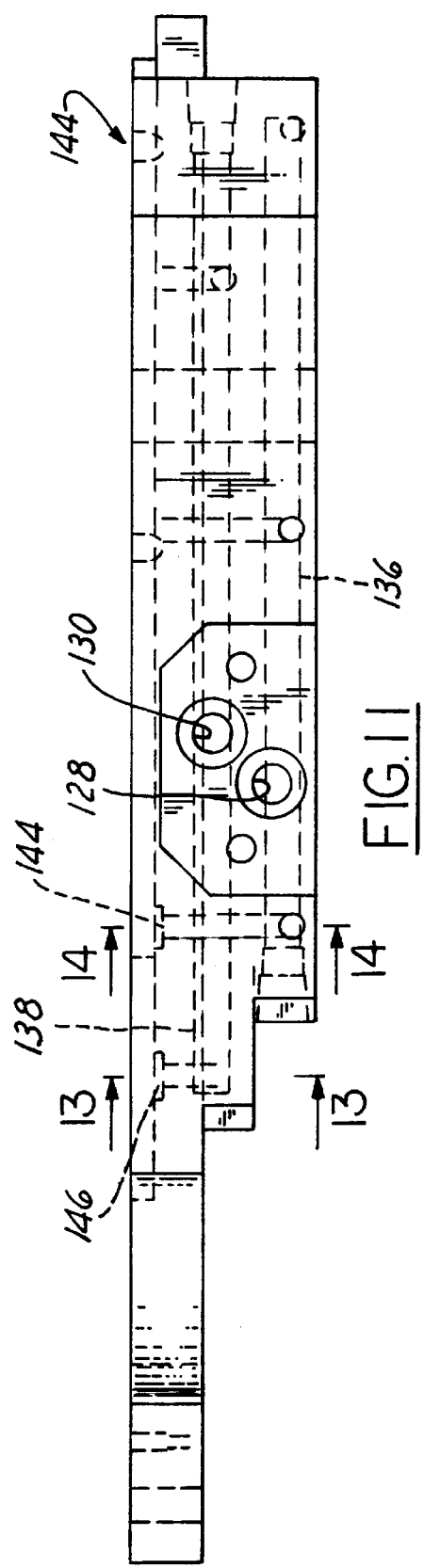

LIQUID COOLING OF GLASSWARE MOLDS

The present invention is directed to the cooling of molds in a glassware forming machine, and more particularly to liquid cooling of the blank molds and/or blow molds in an individual section machine.

BACKGROUND AND OBJECTS OF THE INVENTION

The science of glass container manufacture is currently served by the so-called individual section machine. Such machines include a plurality of separate or individual manufacturing sections, each of which has a multiplicity of operating mechanisms for converting one or more charges or gobs of molten glass into hollow glass containers and transferring the containers through successive stations of the machine section. Each machine section includes one or more blank molds in which a glass gob is initially formed in a blowing or pressing operation, an invert arm for transferring the blanks to blow molds in which the containers are blown to final form, tongs for removing the formed containers onto a deadplate, and a sweepout mechanism for transferring molded containers from the deadplate onto a conveyor. U.S. Pat. No. 4,362,544 includes a background discussion of both blow-and-blow and press-and-blow glassware forming processes, and discloses an electropneumatic individual section machine adapted for use in either process.

In the past, the blank and blow molds of a glassware forming machine have generally been cooled by directing air onto or through the mold parts. Such techniques increase the temperature and noise level in the surrounding environment, and consume a substantial amount of energy. Furthermore, productivity is limited by the ability of the air to remove heat from the mold parts in a controlled manner, and process stability and container quality are affected by difficulties in controlling air temperature and flow rate. It has been proposed in U.S. Pat. Nos. 3,887,350 and 4,142,884, for example, to direct a fluid, such as water, through passages in the mold parts to improve heat extraction. However, heat extraction by liquid cooling can be too rapid and uncontrolled, at least in some areas of the mold, so steps must be taken to retard heat transfer from the inner or forming surface of a mold part to the outer periphery in which the liquid cooling passages are disposed. Various techniques for so controlling liquid-coolant heat extraction have been proposed in the art, but have not been entirely satisfactory.

U.S. application Ser. No. 09/400,123 filed Sep. 20, 1999, assigned to the assignee hereof, discloses a system and method for cooling the forming molds in a glassware forming machine, in which each mold includes a body of heat conductive construction having a central portion with a forming surface for shaping molten glass and a peripheral portion spaced radially outwardly of the central portion. A plurality of coolant passages extend in a spaced array around the peripheral portion of the mold body, and liquid coolant is directed through such passages for extracting heat from the body by conduction from the forming surface. A plurality of openings extend axially into the body radially between at least some of the liquid coolant passages and the forming surface for retarding heat transfer from the forming surface to the liquid coolant passages. The openings have a depth into the mold body, either part way or entirely through the mold body, coordinated with the contour of the forming surface and other manufacturing parameters to control heat transfer from the forming surface to the coolant passages. The openings may be wholly or partially filled with material for further tailoring heat transfer from the forming surface to the coolant passages. The mold body is constructed of austenitic Ni-Resist ductile iron having elevated silicon and molybdenum content. Endplates are carried by the mold body for controlling flow of coolant in multiple passes through the coolant passages. The mold may be either a blank mold or a blow mold.

Although the system and method for cooling molds in a glassware forming machine disclosed in the noted application address problems theretofore extant in the art, further improvements are desirable. In particular, it is desirable to eliminate hoses, tubing and fittings for delivering liquid coolant to and from the mold parts. This liquid coolant flows at elevated temperature, and it is highly desirable to reduce potential damage and leaks in the coolant flow path under the harsh environmental operating conditions of a glassware forming system. Molten glass, abrasive glass particles and spent lubricants can cause damage to the hosing, tubing and fittings. The hoses, tubing and fittings can become loosened or fatigued due to the harsh operating conditions and severe vibration forces during normal operation, and impede rapid maintenance, repair and replacement of the mold parts and operating mechanisms. It is therefore a general object of the present invention to provide a system and method for cooling molds in a glassware forming machine in which all coolant flow passages are enclosed and protected from abrasion and fatigue under the harsh operating conditions of a glassware forming system. Another object of the present invention is to provide a liquid coolant distribution and sealing system that accommodates relative motion between and among system components as the mold bodies are opened and closed.

SUMMARY OF THE INVENTION

Briefly stated, the presently preferred system and method of the invention direct liquid coolant to the blank or blow mold halves of a glassware forming machine through an enclosed pivotal rotary union structure, as distinguished from flexible hoses and the like. A coolant manifold is carried by each pivotal mold arm, and communicates with coolant inlet and outlet ports at the lower end of each mold part. The manifold is connected by a floating shaft seal, a rotary union assembly and a crank arm to a coolant source and coolant return in the section box of the associated IS machine section. Each pivotal connection—i.e., between the section box and the crank arm, between the crank arm and the rotary union assembly, and between the rotary union assembly and the floating shaft seal—comprises a bi-directional rotary union for feeding liquid coolant to the manifold and mold parts, and returning coolant from the manifold and mold parts. Dynamic floating O-ring seals between the coolant manifold and the mold parts, and between the coolant manifold and the floating shaft seal, accommodate relative motion between these components as the mold parts are opened and closed.

More generally, a system for cooling molds in a glassware forming machine in accordance with the presently preferred embodiment of the invention includes a pair of mold arms mounted for movement toward and away from each other, and at least one blank mold or blow mold part carried by each arm and adapted to cooperate with each other to form a glassware forming mold. Each of the mold parts includes at least one coolant passage having an inlet and an outlet disposed adjacent to each other at one end of the mold part. A coolant manifold is carried by each mold arm adjacent to the ends of the mold parts at which the coolant inlet and outlet are disposed, with each manifold having inlet and outlet coolant flow passages coupled to the inlet and outlet of the associated mold parts. A coolant source and a coolant return are disposed in fixed position adjacent to the mold arms, and a pivotal coupling rotary union assembly operatively connects the coolant source and return to the manifold. The pivotal coupling rotary union assembly includes parallel coolant flow paths for directing coolant from the source through the pivotal coupling assembly and the manifold inlet passage to the mold inlet, through the mold part, and from the mold outlet through the manifold outlet passage and the pivotal coupling assembly to the coolant return.

The pivotal coupling rotary union assembly in the preferred embodiment of the invention includes a crank arm assembly having a first crank shaft rotatably coupled to a housing on the section box of the IS machine, a second crank shaft and a crank tie bar interconnecting the first and second crank shafts. The second crank shaft is rotatably received in a shaft link block, as is a manifold tie shaft having a head secured to the side wall of the manifold. Seals in the section box housing and the shaft link block surround the first and second crank shafts and the manifold tie shaft. Parallel coolant flow passages extend from the section box through the first crank shaft, laterally through the crank tie bar, through the second crank shaft, laterally through the shaft link block and through the manifold tie shaft and head to the coolant manifold on the mold arm. In accordance with another feature of the preferred embodiment of the invention, drain passages are formed in the shaft link block, the second and first crank shafts and the interconnecting crank tie bar, and open at each shaft between seals that engage the associated shaft, for draining by force of gravity any coolant that may leak past the seals.

In accordance with another aspect of the present invention, which may be used separately from or more preferably in combination with other aspects of the invention, the mold parts are releasably secured to the associated mold arms by clamps that selectively engage a radial ledge at the lower end of each mold part. Each clamp includes a bridge carried in fixed position on the mold arm, and a lockdown clip carried beneath the bridge for rotation selectively to overlie or clear the ledge on the mold part. Thus, the lockdown clip may be rotated into position to overlie the mold part ledge to hold the mold part ledge on the mold arm, or to clear the mold part ledge so that the mold part may be readily removed by an operator for repair or replacement. A detent locking arrangement between the lockdown clip and the bridge provides for releasable locking of the lockdown clip in either the ledge-overlying or ledge-clearing position of the lockdown clip. A rod preferably extends from the clip through an opening in the bridge parallel to the mold part to a position adjacent to the upper edge of the mold part to facilitate rotation of the lockdown clip into and out of engagement with respect to the mold part. A pin on the mold arm is received in an opening on the underside of the mold part to permit limited rotation of the mold part for self-adjustment with the opposing mold part as the mold arms are brought together.

BRIEF DESCRIPTION OF THE DRAWINGS

The invention, together with additional objects, features and advantages thereof, will be best understood from the following description, the appended claims and the accompanying drawings in which:

FIGS. 11 and 12 are side elevational and top plan views of the manifold illustrated in FIG. 10;

DETAILED DESCRIPTION OF PREFERRED EMBODIMENTS

The disclosure of above-noted U.S. application Ser. No. 09/400,123 filed Sep. 20, 1999, assigned to the assignee hereof, is incorporated herein by reference for purposes of background.

Figure 1:
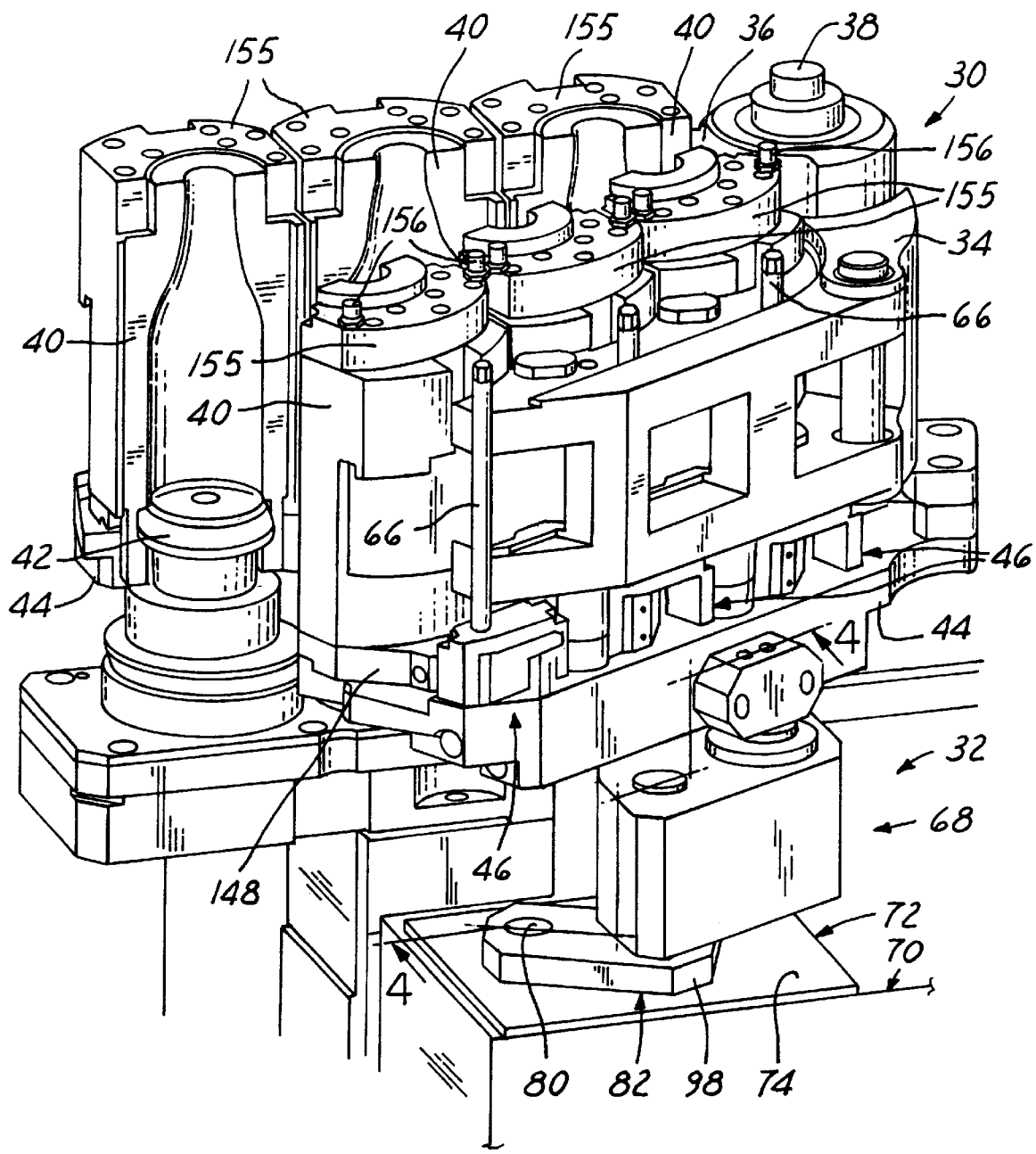
FIG. 1 is a fragmentary perspective view of a blow mold station in an individual section machine equipped with a system for cooling the blow mold parts in accordance with a presently preferred embodiment of the invention.
Figure 2:
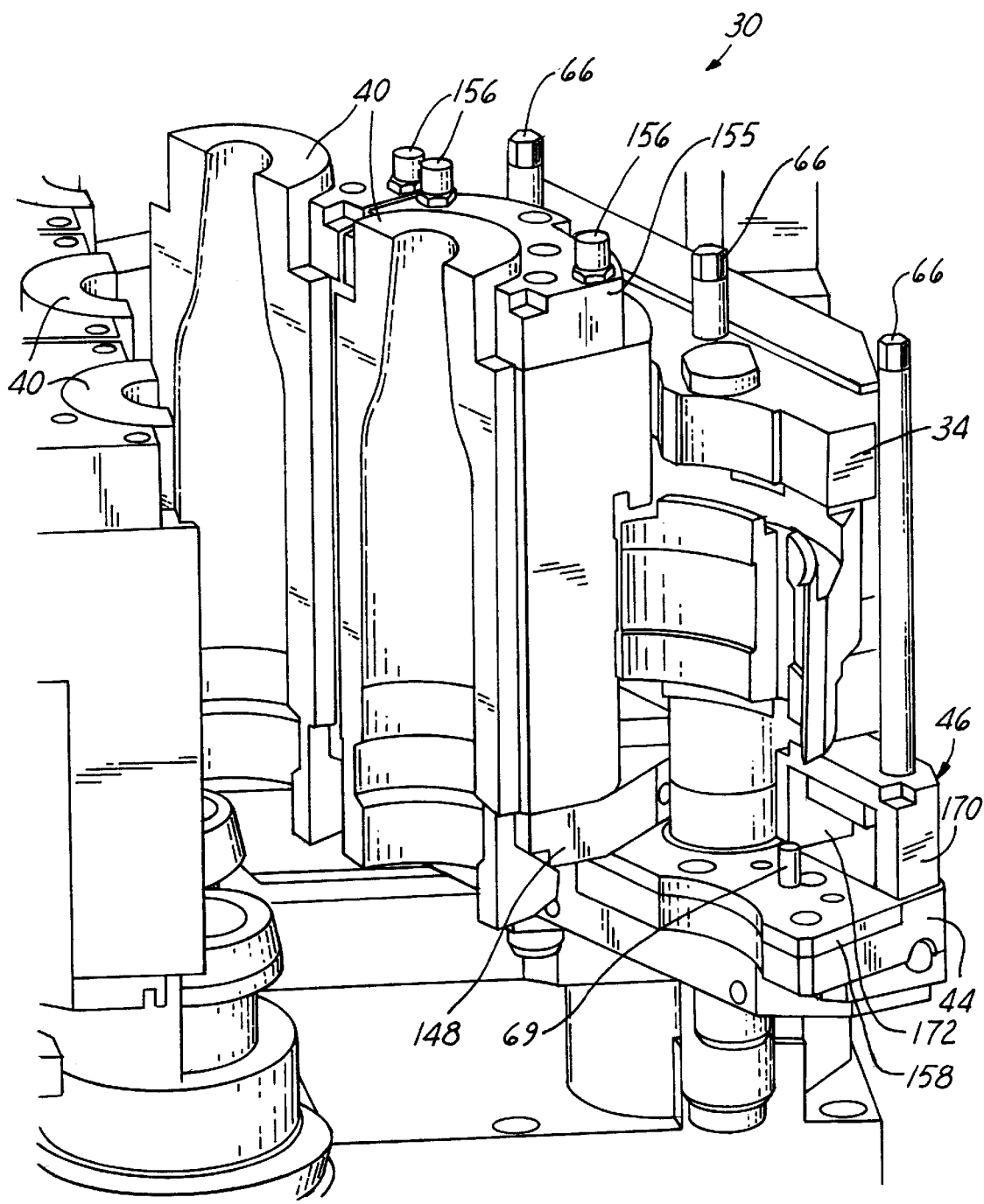
FIG. 2 is a fragmentary perspective view of the blow mold station illustrated in FIG. 1 with one mold part removed to facilitate illustration.

FIGS. 1 and 2 illustrate a portion of the blow mold station 30 of one section of an individual section glassware forming machine equipped with a coolant delivery system 32 in accordance with a presently preferred embodiment of the present invention. A pair of mold arms 34, 36 are pivotally mounted on a stationary bearing shaft 38, and each carry a plurality of mold parts 40. Each mold part 40 is adapted to cooperate with the opposing mold part carried on the opposing arm to form a mold cavity for molding an article of glassware. The presently preferred embodiment is illustrated in the drawings in connection with a blow mold station 30, in which each pair of mold parts 40 cooperates with a bottom mold element 42 and with each other to form a blow mold cavity. It will be understood, however, that the coolant delivery system 32 in accordance with the present invention is equally useful for cooling the blank molds at the blank mold station of an IS machine section, either a linear machine or a rotary machine. The coolant delivery system 32 (FIG. 1) associated with mold arm 34 will be described in detail. The coolant delivery system associated with mold arm 36 is a mirror image of system 32. It will also be appreciated that, although station 30 is illustrated in FIGS. 1 and 2 as a station for a so-called triple gob IS machine, comprising three pairs of mold parts 40, the present invention is equally useful in conjunction with so-called single, double, quad and other types of glassware forming machines.

A coolant manifold 44 is secured beneath mold arm 34 for movement conjointly with the mold arm. A plurality of clamps 46 are carried by manifold 44, each for securing an associated mold part 40 in position relative to the manifold. Each clamp 46 includes a bridge 170 (FIGS. 1–2 and 17–20), having side legs secured to manifold 44 and an upper reach spaced from the opposing face of manifold 44 parallel thereto. A lockdown clip 172 is disposed beneath each bridge 170. Each clip 172 includes a body having a laterally extending finger 174 that is adapted in assembly to overlie a ledge formed by a plate 148 (FIGS. 1–2) that extends laterally outwardly from the lower end of each mold part 40. A pair of pockets 176, 178 are formed on the underside of bridge 170. A rod 180 has a lug 182 press fitted and pinned or otherwise fixedly secured to the lower end thereof. Rod 180 extends upwardly through mold arm 34 or 36 adjacent to an associated mold part 40. The upper end of each rod 180 has a hex head for engagement by an appropriate tool. A dowel pin 184 is press fitted or otherwise secured to a radial lobe on lug 182, and extends upwardly therefrom parallel to rod 180 for selective registry with pockets 176, 178 in bridge 170, as will be described.

Lug 182 and the lower end of rod 180 are positioned in a pocket 186 on the body of clip 172. A spring 188 is captured in compression within pocket 186 beneath lug 182. A pin 190 extends downwardly from clip 172 coaxially with rod 180, and is received in a corresponding pocket on manifold 44 to guide rotation of clip 172. The lobe on lug 182 rotatably couples clip 172 to rod 170. That is, rod 180 may be rotated clockwise (FIGS. 1, 2 and 17–20) to rotate lockdown clip 172 clockwise until detent pin 184 is in registry with detent pocket 176 in bridge 170, at which point the force of spring 188 will urge pin 184 into pocket 176. At this point, the arm 174 of clip 172 clears plate 148 of the associated mold body 40, so that the mold body can be lifted from the mold station by an operator for repair or replacement. When the mold body is replaced in position over a locating pin 69 (FIG. 2) on manifold 44, rod 180 and lockdown clip 172 may be rotated counterclockwise until ball pin 184 registers with detent pocket 178 in bridge 170, at which point finger 174 overlies mold plate 148 and holds the mold in position. In FIG. 1, the clamp 46 associated with the first mold part is illustrated in the non-engaged position for releasing the mold part, while the clamps 46 associated with the second and third mold parts are illustrated in the engaged position. Rods 180 and pins 190 also function to hold clips 172 in position beneath bridges 170.

Figure 21:
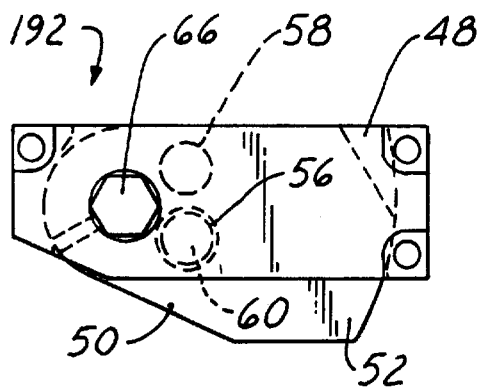
FIGS. 21 and 22 are a top plan view and a partially sectioned side elevational view of a modified mold lockdown mechanism for the system of FIGS. 1 and 2.
Figure 22:
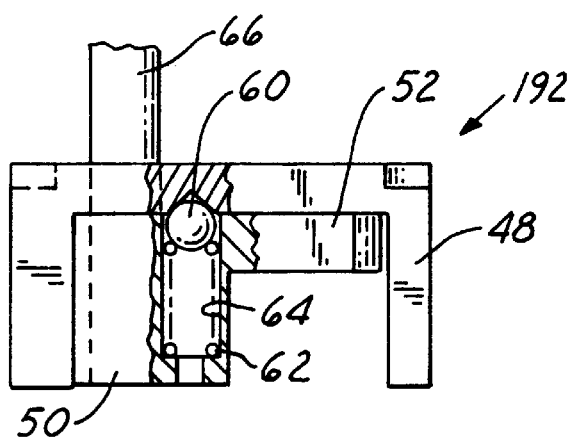

FIGS. 21–22 illustrate a modified lockdown clamp 192. Each clamp 192 includes a bridge 48, having side legs secured to manifold 44 and an upper reach spaced from the opposing face of manifold 44 parallel thereto. A lockdown clip 50 is disposed beneath each bridge 48. Each clip 50 includes a body having a laterally extending finger 52 that is adapted in assembly to overlie the plate 148 that extends laterally outwardly from the lower end of each mold part 40. A pair of pockets 56, 58 are formed on the underside of bridge 48. A detent ball 60 and a coil spring 62 are captured in compression within a pocket 64 on the body of lockdown clip 50 for selective registry with detent pockets 56, 58 on the underside of bridge 48. A clip rod 66 is coupled to the body of each lockdown clip 50, and extends upwardly therefrom through mold arm 34 or 36 for selectively rotating clip 50 and clip finger 52 into and out of overlying engagement with the ledge 54 of the associated adjacent mold part. That is, rod 66 may be rotated clockwise to rotate lockdown clip 50 clockwise until detent ball 60 is in registry with detent pocket 56 in bridge 48, at which point the force of spring 62 will urge ball 60 into pocket 56. At this point, the finger 52 of clip 50 clears plate 148 of the associated mold body 40, so that the mold body can be lifted from the mold station for repair or replacement by an operator. When the mold body is replaced in position over a locating pin 69 (FIG. 2) on manifold 44, rod 66 and lockdown clip 50 maybe rotated counterclockwise until ball detent 60 registers with detent pocket 58 in bridge 48, at which point leg 52 overlies mold plate 148 and holds the mold in position.

Figure 3:
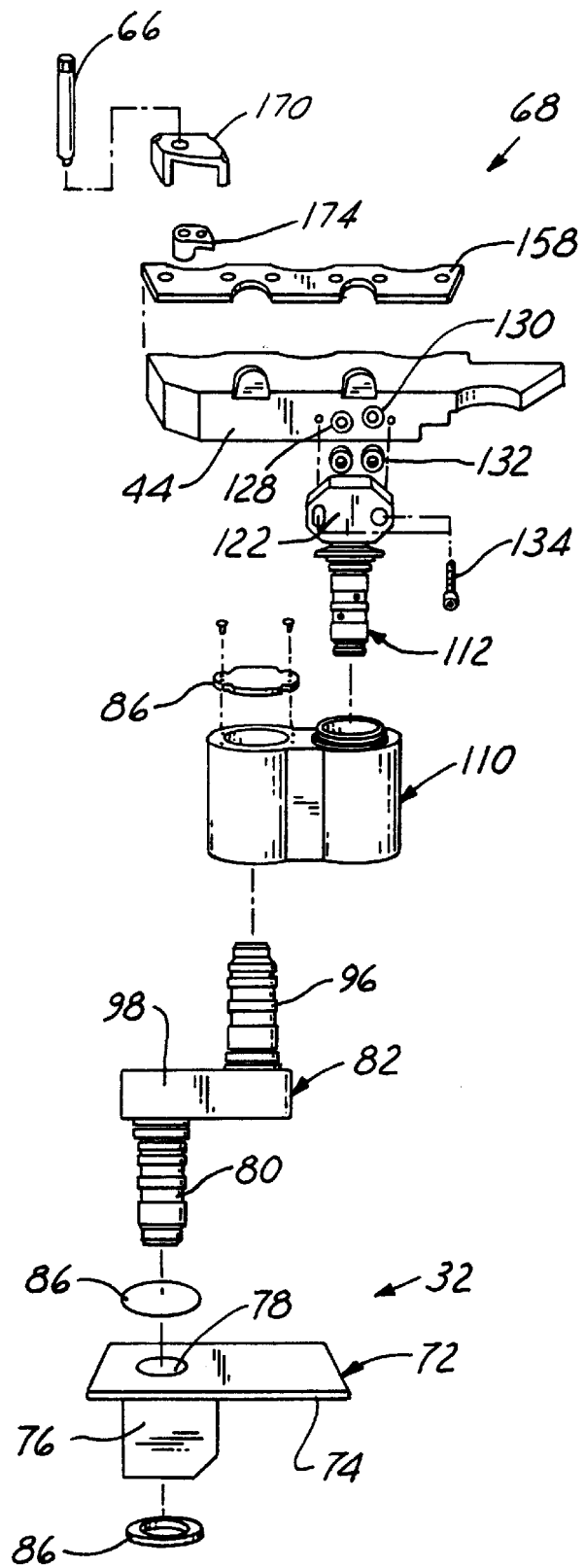
FIG. 3 is an exploded view of the coolant delivery arrangement at the blow mold station illustrated in FIGS. 1–2.
Figures 4, 4A:
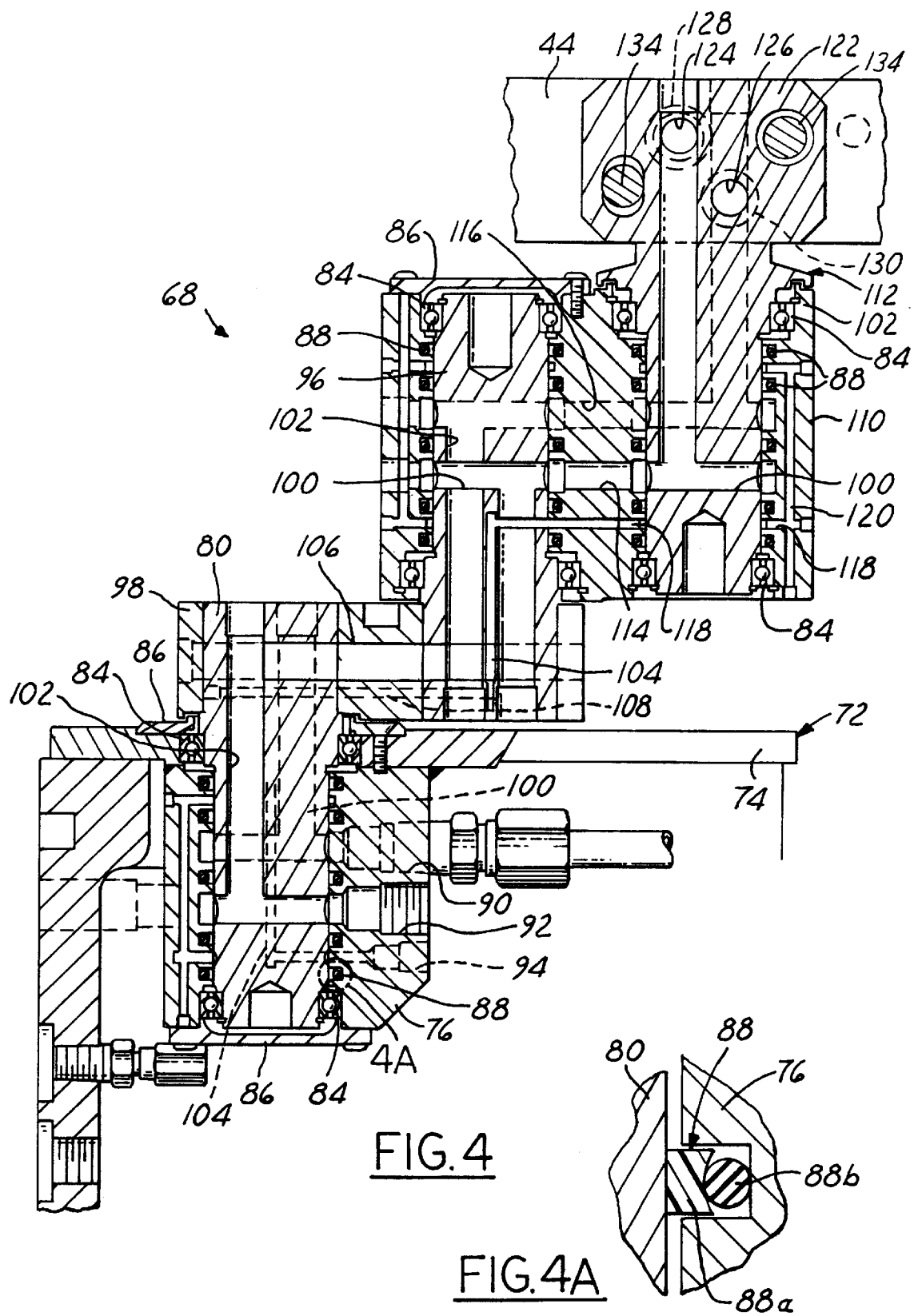
FIG. 4 is a developed sectional view of the rotary union coolant delivery arrangement in FIGS. 1–3.
FIG. 4A is an enlarged sectional view of the portion of FIG. 4 within the circle 4A.
Figure 5:
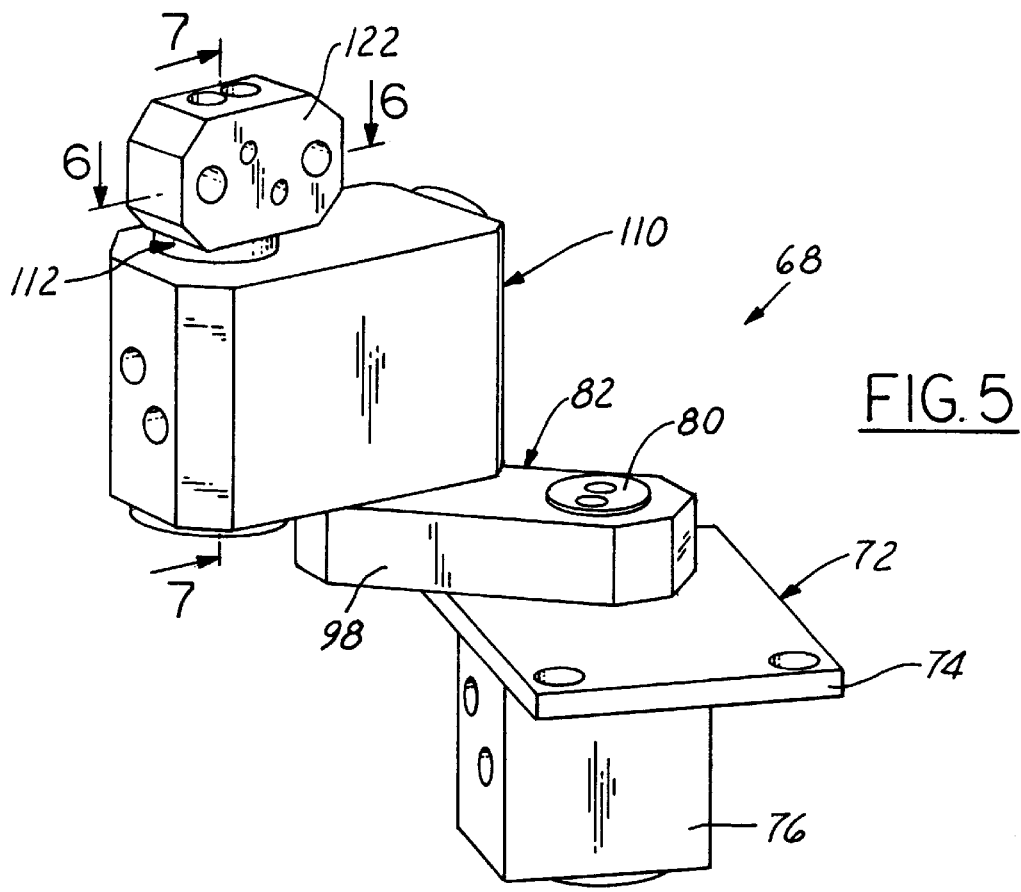
FIG. 5 is a perspective view of the coolant delivery rotary union assembly in FIGS. 1–3 and 4.
Figure 6:
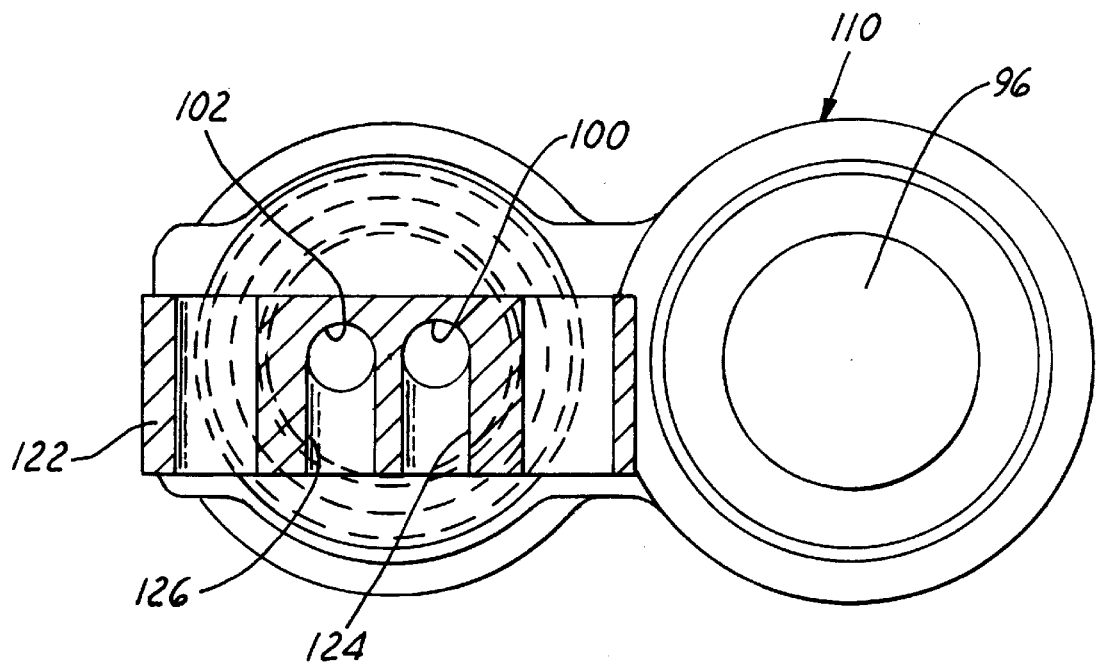
FIGS. 6 and 7 are fragmentary sectional views taken substantially along the respective lines 6—6 and 7—7 in FIG. 5.

Coolant delivery system 32 also includes a rotary union assembly 68 (FIGS. 1 and 3–5) having a section box housing 72 that is insertable into an opening in the section box 70 at each machine section. Section box housing 72 includes a top panel 74 and a block 76 welded or otherwise secured to the underside of panel 74. Block 76 has a central opening that aligns with an opening 78 in panel 74 (FIG. 3) for receiving the lower crank shaft 80 of a crank arm assembly 82. Shaft 80 is supported within block 76 by axially spaced bearings 84 (FIG. 4), which are enclosed by bearing cover plates 86. A plurality of axially spaced seals 88 are mounted in corresponding channels formed on the inside diameter of block 76 for sealing engagement with opposing lands on shaft 80. A pair of ports 90, 92 extend laterally through block 76, and open to the internal bore of block 76 on laterally opposed sides of the central seal 88. A drainage port 94 extends laterally into block 76 and opens to the central bore of the block between the two lowermost seals 88. Each seal 88 includes an annular Teflon (trademark) based rotary seal 88a in sliding engagement with the associated shaft, and an elastomeric O-ring 88b. O-rings 88b are in radial compression to urge seal 88a radially inwardly, and to make radially outward sealing engagement with the base of the associated seal groove.

Figure 15:
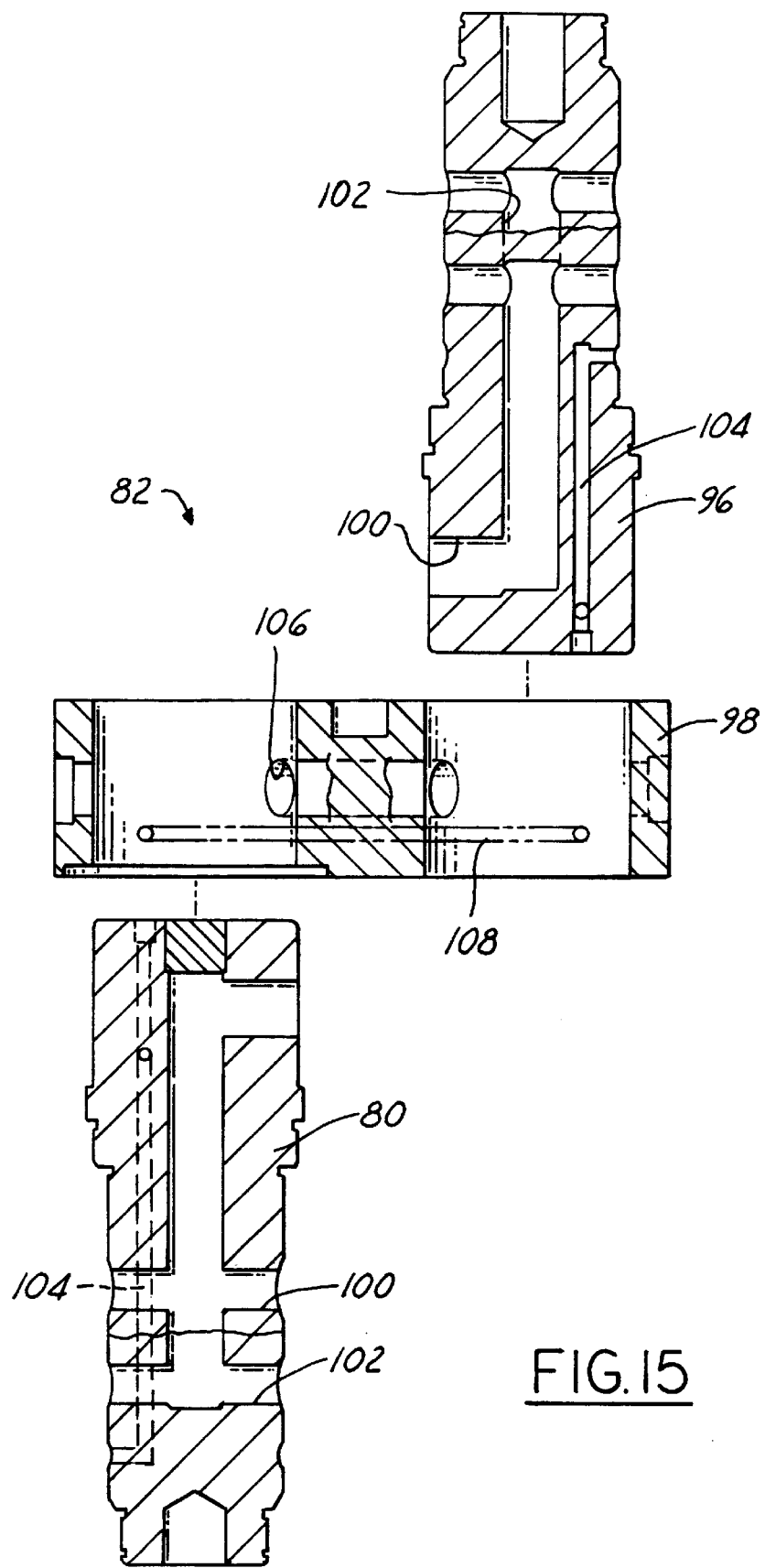
FIG. 15 is an exploded sectional elevational view of the crank arm subassembly in the preferred coolant delivery system of the present invention.

Crank arm assembly 82 (FIGS. 3–5 and 15) includes first or lower crank shaft 80 and a second or upper crank shaft 96 extending from opposite ends of crank tie bar 98 in opposite parallel axial directions. Lower and upper crank shafts 80, 96 are essentially identical, each having a pair of water flow passages 100, 102 extending axially through the mid portion of the rank shaft, and opening laterally outwardly adjacent to the ends of the crank shaft. A third passage 104 of reduced diameter extends axially through the mid portion of each crank shaft, and opens laterally outwardly from the crank shaft, opening and circumferential channel associated with passage 100 in lower crank shaft 80 registers with port 90 of block 76 (FIG. 4), and the laterally opening end of passage 102 and associated circumferential channel registers with port 92 of block 76. The lateral opening of passage 104 registers in assembly with drainage port 94 in block 76. Within crank tie bar 98, there are a pair of longitudinal parallel passages 106, 107 (FIGS. 4, 9 and 15) that respectively register in assembly with the lateral openings of passages 100, 102 at the upper end of lower crank shaft 80, and with the associated passages at the lower end of upper crank shaft 96. Likewise, there is a passage 108 in crank tie bar 98 that interconnects the associated ends of drain passages 104 in lower and upper crank shafts 80, 96. The ends of crank shafts 80, 96 are press fitted, shrunk fit or otherwise rigidly secured to crank tie bar 98 so as to maintain alignment and sealing of the various passage ends, which is to say that crank shafts 80, 96 do not rotate within the corresponding openings of tie bar 98.

A shaft link block 110 rotatably receives the upper end of upper crank shaft 96, and rotatably receives the lower end of a manifold tie shaft 112. Shaft link block 10 has a pair of parallel passages 114, 116 (FIGS. 4 and 9) that interconnect the parallel fluid passages 100, 102 of upper crank shaft 96 with the corresponding parallel fluid passages in tie shaft 112, which are identified by the same reference numerals 100, 102 to facilitate understanding. Likewise, drain passage 104 in upper crank shaft 96 is aligned with a lateral drain passage 118 in shaft link block 110, which in turn is connected to a longitudinal drain passage 120 in the shaft link block. Drain passages 118, 120 in shaft link block 110 open between the lowermost and uppermost pairs of seals 88 in the shaft link block for collecting any coolant that may leak past the seals. There is no drain passage in tie shaft 112. Seals 88 surround upper crank shaft 96 and tie shaft 112 in link block 110, and each shaft is supported by spaced roller bearings 84 with associated bearing covers 86. Parallel passages 114, 116 in link block 110 open on opposed sides of the middle seal 88, and parallel passages 100, 102 in shafts 96, 112 open at corresponding axial positions on opposed sides of the center seal, as previously described.

Figure 7:
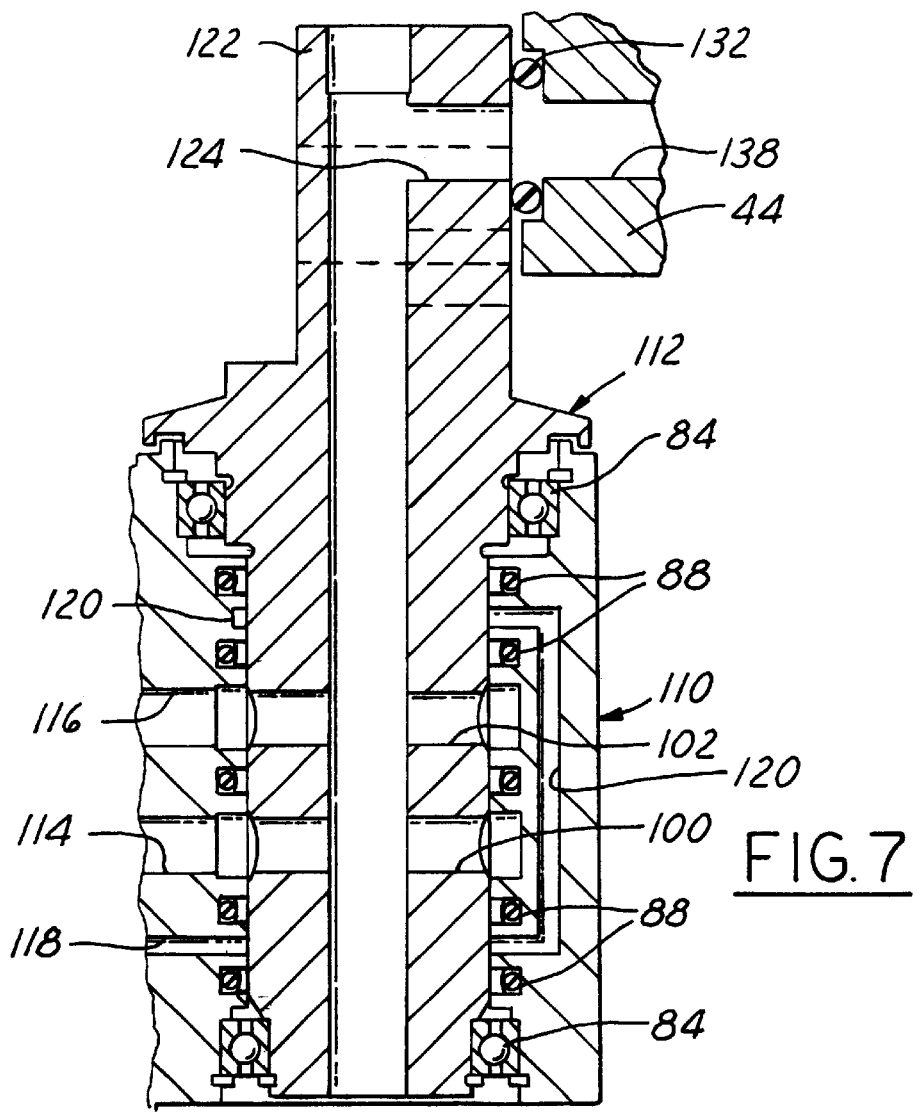

Tie shaft 112 has an enlarged integral head 122 (FIGS. 3–7) formed at the upper end thereof. Head 122 is secured to the sidewall of manifold 44. Passages 100, 102 in tie shaft 112 terminate within head 122 in a pair of lateral openings or ports 124, 126 respectively. These openings or ports, which are vertically or axially staggered with respect to the longitudinal dimension of tie shaft 112, register in assembly with a pair of openings or ports 128. 130 in the opposing sidewall of manifold 44. These openings 128, 130 are circumferentially enlarged at the outside surface of the manifold, and a pair of O-rings 132 (FIGS. 3 and 7) are disposed in a countersunk pocket around each opening 128, 130. A pair of screws 134 loosely secure tie shaft head 122 to the opposing face of manifold 44, with O-rings 132 being compressed between the opposing faces of head 122 and manifold 44. The enlarged circumferential dimension of openings 128, 130, coupled with the O-ring seals and the loose mounting of head 122 to the manifold, accommodate relative movement between the tie shaft head and the manifold as the molds are opened and closed without losing communication between the coolant openings or losing the seal around the coolant openings, thus forming a floating shaft seal with the side face of the manifold.

Figure 8:
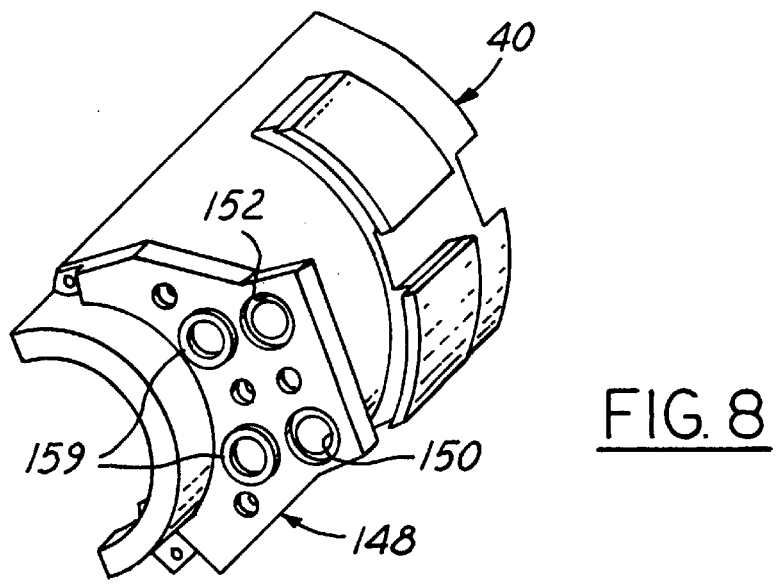
FIG. 8 is a bottom perspective view of a blow mold part illustrated in FIGS. 1–2.
Figure 9:
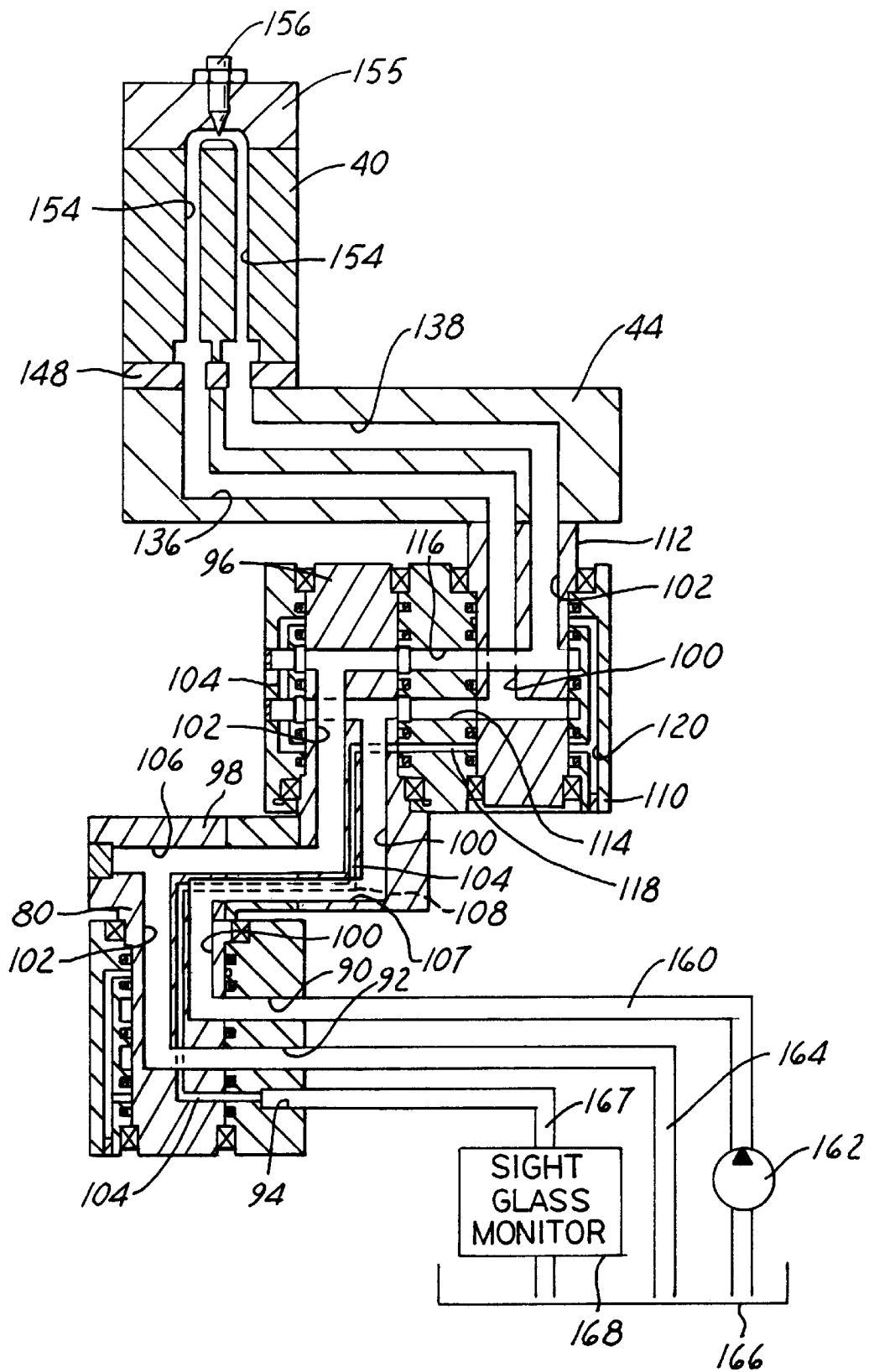
FIG. 9 is a partially schematic illustration of coolant delivery and drainage in the coolant delivery system of FIGS. 1–3 and 4–7.
Figure 10:
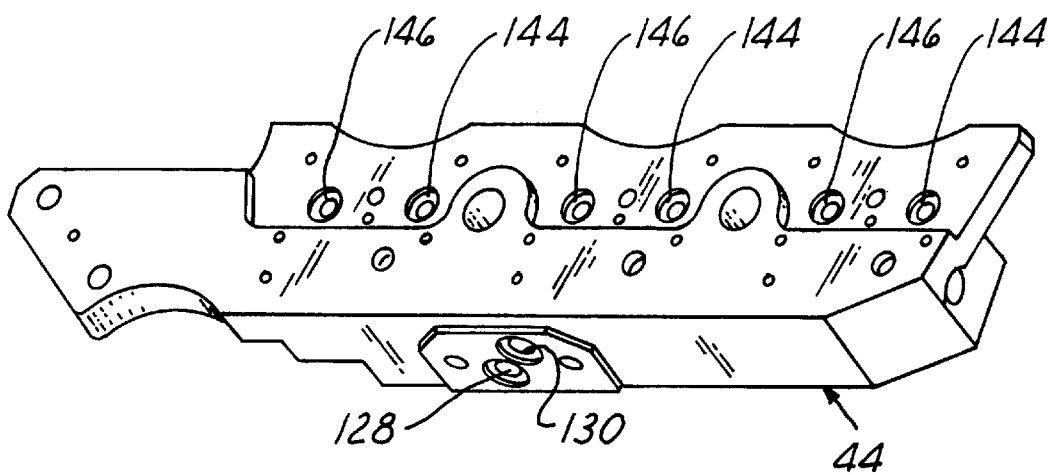
FIG. 10 is a perspective view of the coolant delivery manifold illustrated in FIGS. 1–3.
Figure 13:
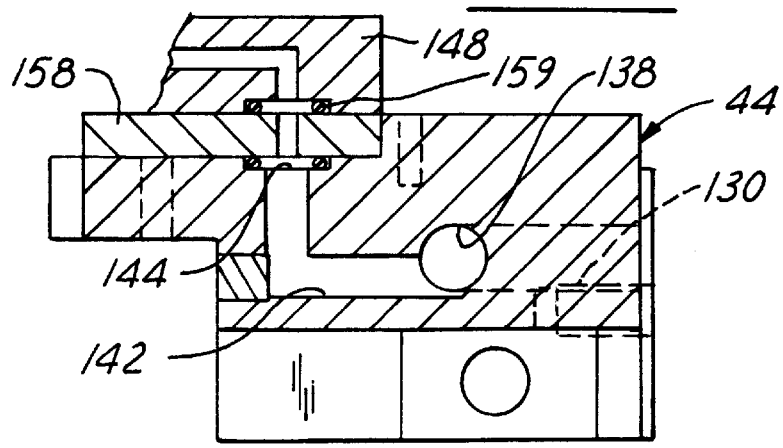
FIGS. 13 and 14 are sectional views taken substantially along the lines 13—13 and 14—14 in FIG. 11.
Figure 14:
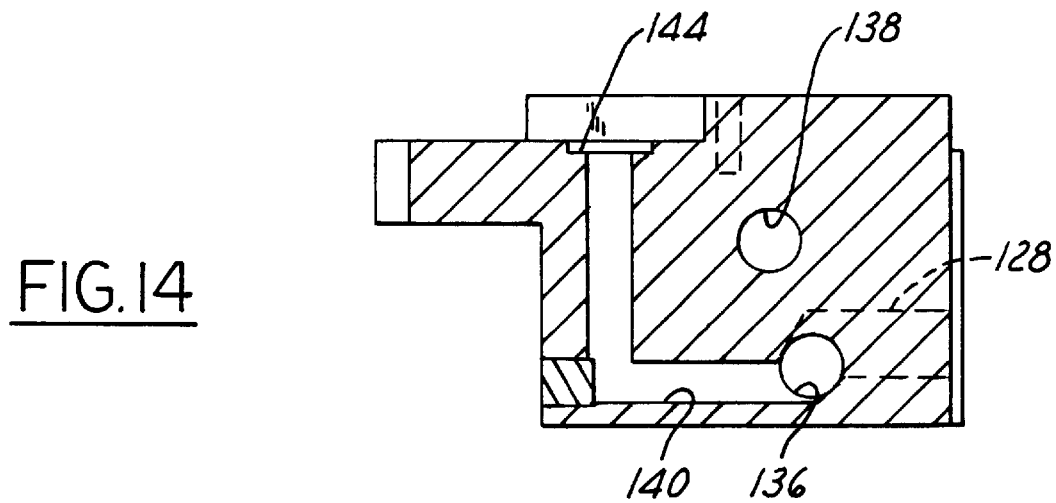
Figure 16:
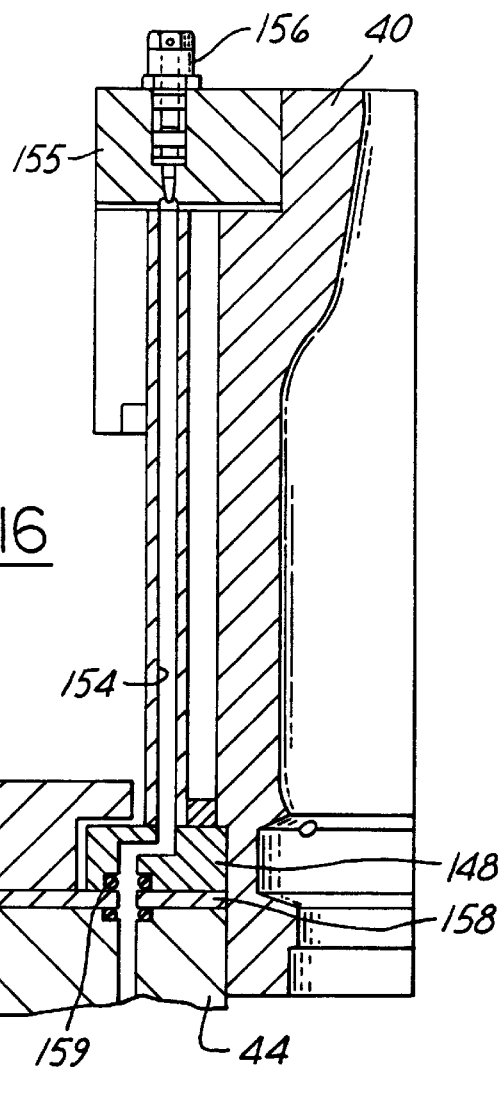
FIG. 16 is a fragmentary sectional view of a mold part in the coolant delivery system in accordance with the preferred embodiment of the invention.
Figure 17:
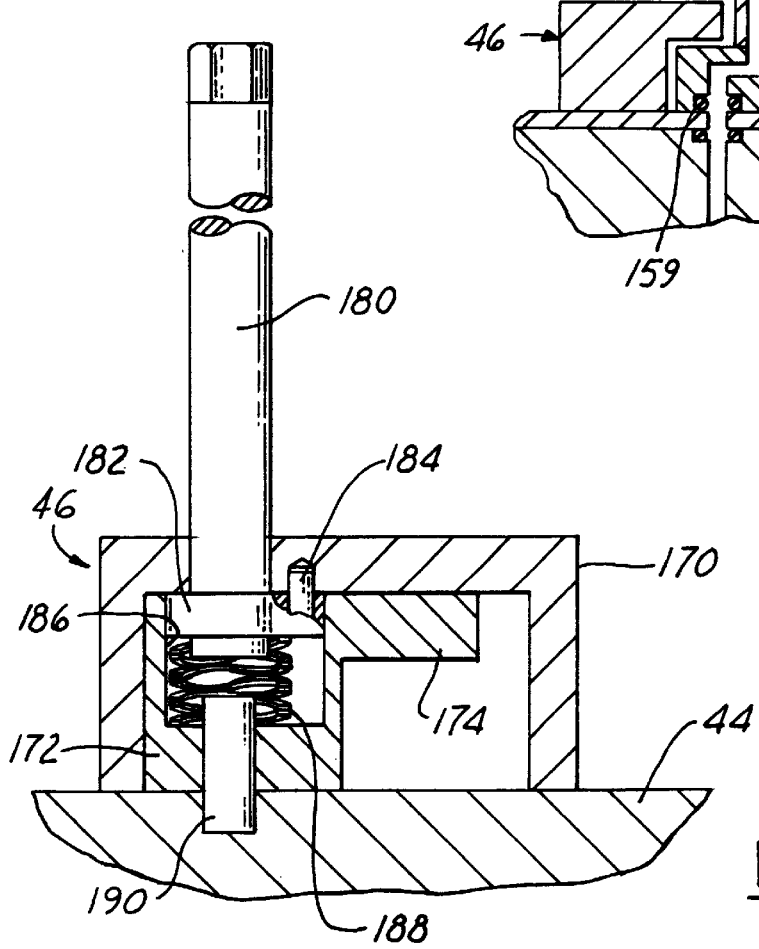
FIG. 17 is a sectional view of the mold lockdown mechanism in FIGS. 1 and 2.
Figure 18:
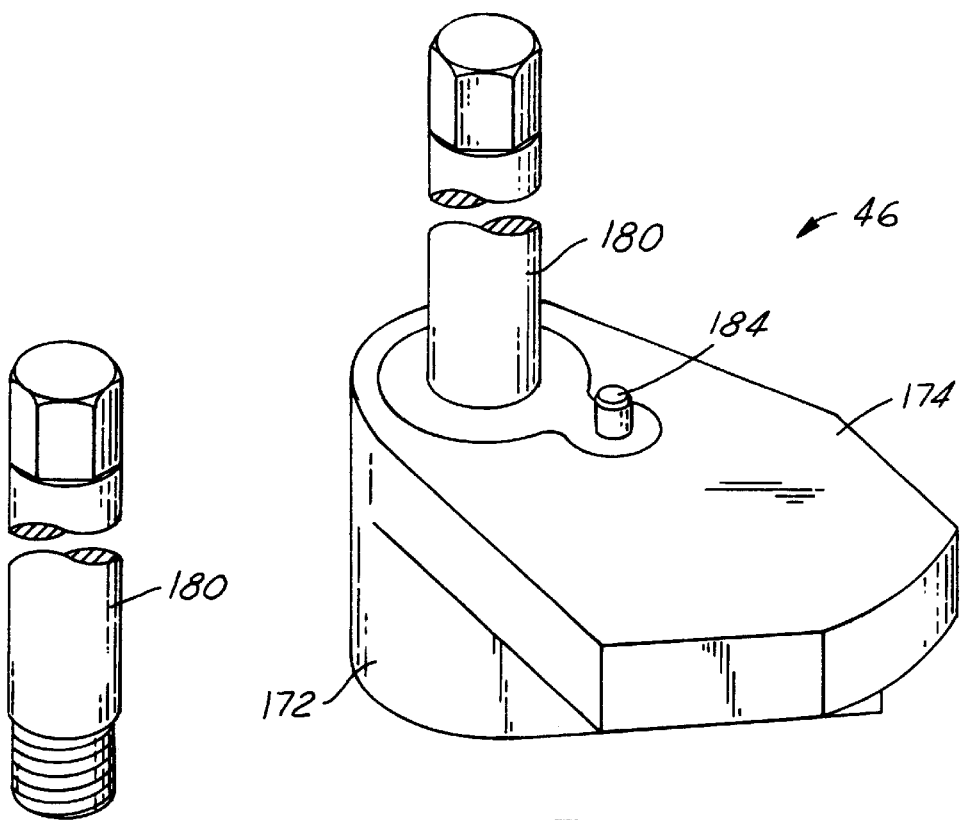
FIG. 18 is a perspective view of the lock clamp subassembly in FIG. 17.
Figure 19:
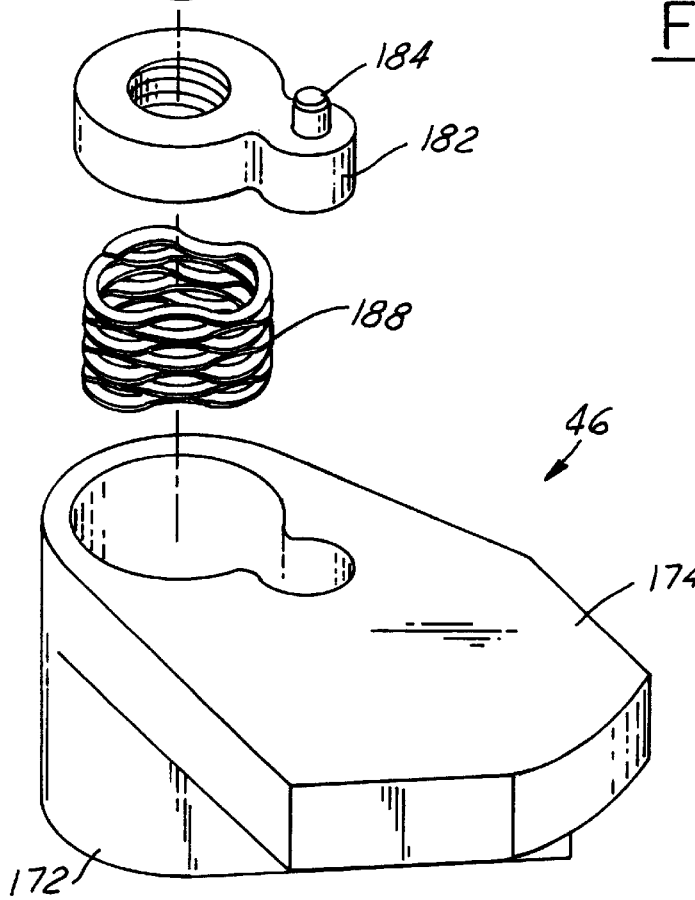
FIG. 19 is an exploded perspective view of the clamp subassembly in FIG. 18.
Figure 20:
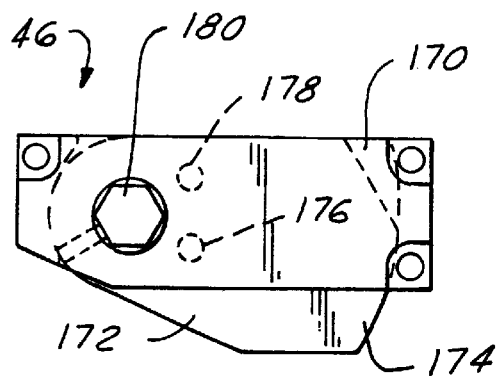
FIG. 20 is a top plan view of the mold lockdown mechanism in FIG. 17.

Manifold openings 128, 130 communicate within the body of manifold 44 with a pair of longitudinal parallel coolant passages 136, 138 that extend through the body of the manifold (FIGS. 9–14). At each mold mounting position on manifold 44 (three positions in the illustrated embodiment), a pair of side passages 140, 142 extend from respective longitudinal coolant passages 136, 138, and terminate in a pair of adjacent upwardly opening coolant ports 144, 146 at the upper surface of manifold 44. Each mold body 40 has a plate 148 mounted at the lower end thereof (FIGS. 8–9 and 16). Each plate 148 has a pair of coolant openings 150, 152 that register in assembly with openings 144, 146 in manifold 44. As disclosed in the above-referenced copending U.S. application, lower plate 148 cooperates with upper plate 155 for routing coolant through a plurality of passages 154 (FIG. 16) around the periphery of mold body 40. A flow adjuster needle 156 is mounted on upper plate 155 for adjusting the effective cross section to fluid flow of mold body coolant passage 154. This helps balance coolant flow among the various mold bodies, and can tailor the heat conduction properties of the mold body and associated coolant passages. A wear plate 158 is disposed between manifold 44 and the several mold bodies 40 mounted thereon. The lower openings 150, 152 of plate 148 are enlarged and countersunk to receive associated O-rings 159. The enlarged dimensions of openings 150, 152, coupled with O-rings 159, permit limited sliding movement between mold bodies 40 and the underlying wear plate and manifold as the molds are opened and closed, while maintaining sealed fluid communication between these elements.

There is thus provided a continuous path for fluid coolant circulation from the source of fluid coolant at section box 70, through rotary union assembly 68 (section box housing 72, crank arm assembly 82, shaft link block 110 and manifold tie shaft 112) and manifold 44 to each mold body, and then from each mold body back through manifold 44 and rotary union assembly 68 to the return at section box 70. More specifically, and referring to FIG. 9, there is a continuous path for coolant fluid flow from port 90 of section box housing 72 through passage 100 of lower crank shaft 80, passage 107 of crank tie bar 98, passage 100 of upper crank shaft 96, passage 114 of shaft link block 110, passage 100 of tie shaft 112 and passage 136 of manifold 44 to coolant passage 154 of mold body 40. Two passes of coolant through the mold body are illustrated in FIG. 9, although multiple passes may be performed as disclosed in the above-referenced copending application. There is then a continuous path for return fluid from passage 154 of mold body 40 through passage 138 of manifold 44, passage 102 of tie shaft 112, passage 116 of shaft link block 110, passage 102 of upper crank shaft 96, passage 106 of crank tie bar 98, passage 102 of lower crank shaft 80 and passage 92 of section box housing 72. Likewise, there is a continuous path for drainage fluid flow from passages 120, 118 in shaft link block 110 through passage 104 in upper crank shaft 96, passage 108 in crank tie bar 98 and passage 104 in lower crank shaft 80 to port 94 of section box housing 72. Port 90 is connected by a removable conduit 160 to a pump 162, and port 92 is connected by a removable conduit 164 to a sump 166. Drain port 94 is connected by a removable conduit 167 to sump 66 through a sight glass monitor 168. Monitor 168 allows monitoring of the amount of fluid leakage at the seals.

There have thus been disclosed a system and method for cooling molds in a glassware forming machine that fully satisfy all of the objects and aims previously set forth. Coolant fluid flow is completely enclosed, thus eliminating rupture, cracking and fatigue problems associated with the use of external hoses, tubes and fittings. The fluid flow joints between the crank arm assembly and the manifold, and between the manifold and the molds, include sliding seal arrangements that readily accommodate motion of these elements with respect to each other as the molds are opened and closed. A lockdown clamp arrangement has been disclosed that accommodates rapid assembly and disassembly of mold bodies from the cooling system for maintenance and repair, and which accommodates minor motion of the mold bodies with respect to each other and with respect to the mounting arrangement as the molds are opened and closed.

Several modifications have been suggested. Other alternatives and modifications will readily suggest themselves to persons of ordinary skill in the art in view of the foregoing discussion. The invention is intended to embrace all such alternatives and modifications as fall within the spirit and broad scope of the appended claims.

What is claimed is:

1. A system for cooling molds in a glassware forming machine, which comprises:

a pair of mold arms mounted for movement toward and away from each other, at least one mold part carried by each said arm and adapted to cooperate with each other to form a glassware mold, each of said mold parts including at least one coolant passage having an inlet and an outlet adjacent to each other at one end of said mold part, a coolant manifold carried by each said arm adjacent to said one end of said at least one mold part, said manifold having inlet and outlet coolant flow passages coupled to said inlet and said outlet of said at least one mold part, a coolant source and a coolant return disposed in fixed position adjacent to said arms, and pivotal coupling means operatively connecting said coolant source and return to said manifold, said pivotal coupling means including parallel coolant flow paths for directing coolant from said source through said pivotal coupling means and said manifold inlet passage to said mold inlet, through said mold part, and from said mold outlet through said manifold outlet passage and said pivotal coupling means to said coolant return.

2. The system set forth in claim 1 wherein said pivotal coupling means includes a tie shaft coupled to said manifold and having a first axis, a crank shaft coupled to said coolant source and return and having a second axis, and means operatively coupling said tie shaft to said crank shaft such that said tie shaft and said crank shaft are free to rotate about said first and second axes and coolant is free to flow through said tie shaft, said crank shaft and said coupling means to and from said manifold.

3. The system set forth in claim 2 wherein said coupling means comprises a second crank shaft having a third axis, a crank tie bar coupling said second crank shaft to said first crank shaft, and a shaft link block coupling said second crank shaft to said tie shaft such that said second crank shaft is free to rotate about said third axis and coolant is free to flow through said first crank shaft, said crank tie bar, said second crank shaft, said shaft link block and said tie shaft to and from said manifold.

4. The system set forth in claim 3 wherein said coupling means further comprises seals engaging said first crank shaft, said second crank shaft and said tie shaft, and means for draining coolant that leaks past said seals.

5. The system set forth in claim 4 wherein said draining means comprises coolant drain passages in said shaft link block, said second crank shaft, said crank tie bar and said first crank shaft for returning coolant that leaks past said seals.

6. The system set forth in claim 5 wherein said crank tie bar receives a first end of said first crank shaft and a second end of said second crank shaft, wherein said shaft link block receives a second end of said second crank shaft and a first end of said tie shaft, and wherein said parallel coolant flow paths comprise parallel source and return flow passages through said first crank shaft opening laterally into said crank tie bar, parallel source and return flow passages in said second crank shaft opening laterally into said shaft tie block at said second end of said second crank shaft, parallel source and return flow passages in said shaft link block, and parallel source and return flow passages in said tie shaft opening laterally into said shaft link block at said first end of said tie shaft.

7. The system set forth in claim 6 wherein said seals comprise annular seals in said shaft link block and said crank tie bar slidably engaging said shafts and sealing said source and return flow passages from each other and from ambient, and wherein said coolant drain passages in said shaft link block and said crank tie bar open between said annular seals.

8. The system set forth in claim 2 wherein said coupling means includes seals between said coupling means and said tie shaft and said first crank shaft, and means for draining coolant that leaks past said seals.

9. The system set forth in claim 8 wherein said draining means comprises coolant drain passages in said first crank shaft and said coupling means for returning to said coolant return any coolant that leaks past said seals.

10. The system set forth in claim 9 further comprising means for monitoring coolant return that leaks past said seals.

11. The system set forth in claim 9 wherein said parallel coolant flow paths comprise parallel source and return flow passages through said first crank shaft opening laterally into said coupling means, parallel source and return flow passages through said coupling means, and parallel source and return flow passages through said tie shaft, wherein said seals comprise annular seals in said coupling means slidably engaging said first crank shaft and said tie shaft and sealing said source and return flow passages from each other and from ambient, and wherein said coolant drain passages in said coupling means open between said annular seals at both of said shafts.

12. The system set forth in claim 2 wherein said manifold has a top on which said at least one mold part is mounted and a side to which said tie shaft is coupled.

13. The system set forth in claim 12 wherein said tie shaft has a head with laterally opening source and return flow passages, wherein there are seals between said head and said manifold surrounding said laterally opening source and return flow passages, and wherein said tie shaft head is secured to said side of said manifold in such a way as to permit limited relative movement between said manifold and said tie bar head as said mold arms open and close said mold parts while maintaining sealing engagement at said seals between said head and said manifold.

14. The system set forth in claim 1 wherein said inlet and outlet of said coolant passages in said at least one mold part open at an axial end of said mold part, wherein said at least one mold part is mounted on end on said manifold, and wherein said inlet and outlet coolant flow paths in said manifold open upwardly into said mold part.

15. The system set forth in claim 14 wherein there are sealing means surrounding said inlet and outlet flow passages between said manifold and said mold part, and wherein said mold part is secured to said manifold in such a way as to permit limited relative movement between said mold part and said manifold as said mold arms open and close said mold parts while maintaining sealing engagement at said sealing means between said manifold and said mold part.

16. The system set forth in claim 15 further comprising means for securing said mold parts to said manifold, including a radial ledge at a lower end of said mold part and clamp means on said manifold for selectively engaging said ledge.

17. The system set forth in claim 15 wherein said clamp means comprises a bridge carried by said manifold and a lockdown clip carried beneath said bridge for rotation selectively to overlie said ledge.

18. The system set forth in claim 17 further comprising detent means between said lockdown clip and said bridge for releasably holding said clip in a position overlying said ledge to secure said mold part and a position spaced from said ledge to release said mold part.

19. The system set forth in claim 18 wherein said detent means comprises a spring detent carried by said clip and a pair of detent pockets on an underside of said ledge.

20. The system set forth in claim 19 wherein said clamp means further comprises a rod extending from said clip parallel to said mold part for selectively rotating said clip.

21. The system set forth in claim 20 comprising a plurality of mold parts carried by each said arm, a coolant manifold carried by each said arm and coupled to the mold parts on the associated arm, pivotal coupling means coupling each said manifold to said coolant source and return, and separate clamp means securing each said mold part to its associated manifold.

22. A glassware forming machine that includes:
   a pair of mold arms mounted for movement toward and away from each other,
   at least one mold part carried by each said arm and adapted to cooperate with each other to form a glassware mold cavity, and
   means for releasably securing each said mold part to its associated arm comprising a ledge that extends radially outwardly with respect to said cavity from a lower end of each said mold part and clamp means for selectively engaging said ledge,
   said clamp means comprising a bridge carried in fixed position on an upper surface of said mold arm radially outwardly of said mold and said ledge, and a lockdown clip carried beneath said bridge between said bridge and said upper surface for rotation selectively to overlie said ledge and capture said ledge between said lockdown clip and said upper surface of said mold arm.

23. The machine set forth in claim 22 further comprising detent means between an upper surface of said lockdown clip and an underside of said bridge for releasably holding said clip in a position overlying said ledge to secure said mold part and a position spaced from said ledge to release said mold part.

24. The machine set forth in claim 23 wherein said detent means comprises a spring detent carried by said clip and a pair of spaced detent pockets on said underside of said bridge.

25. The machine set forth in claim 24 wherein said clamp means further comprises a rod disposed externally adjacent to each mold part and extending from said clip parallel to said mold cavity for selectively rotating said clip.

26. The machine set forth in claim 25 comprising a plurality of mold parts carried by each said arm, a coolant manifold carried by each said arm and coupled to the mold parts on the associated arm, pivotal coupling means coupling each said manifold to said coolant source and return, and separate clamp means securing each said mold part to its associated manifold.

27. The machine set forth in claim 22 further comprising:
   at least one coolant passage in each of said mold parts having an inlet and an outlet disposed adjacent to each other at one end of said mold part,
   a coolant manifold carried by each said arm adjacent to said one end of said at least one mold part, said manifold having inlet and outlet coolant flow passages coupled to said inlet and said outlet of said at least one mold part,
   a coolant source and a coolant return disposed in fixed position adjacent to said arms, and
   pivotal coupling means operatively connecting said coolant source and return to said manifold, said pivotal coupling means including parallel coolant flow paths for directing coolant from said source through said pivotal coupling means and said manifold inlet passage to said mold inlet, through said mold part, and from said mold outlet through said manifold outlet passage and said pivotal coupling means to said coolant return.

28. A method of cooling molds in a glassware forming machine, which comprises the steps of:
   (a) mounting a pair of mold parts on associated mold arms for cooperation with each other to form a glassware mold, each of said mold parts including at least one coolant passage having an inlet and an outlet adjacent to each other at one end of said mold part,
   (b) mounting a coolant manifold on each said arm adjacent to said one end of each said mold part, each said manifold having inlet and outlet coolant flow passages coupled to said inlet and said outlet of said mold parts,
   (c) providing a coolant source and a coolant return in fixed position adjacent to said arms, and
   (d) coupling each said manifold to said coolant source and return by pivotal coupling means including crank shafts and arms having internal parallel coolant flow passages for directing coolant from said source through said pivotal coupling means and said manifold to said mold parts, and from said mold parts through said manifolds and said pivotal coupling means to said return.

29. A glassware forming machine that includes:
   a pair of mold arms mounted for movement toward and away from each other,
   at least one mold part carried by each said arm and adapted to cooperate with each other to form a glassware mold,
   means for releasably securing each said mold part to its associated arm comprising a radial ledge at the lower end of each said mold part and clamp means for selectively engaging said ledge,
   said clamp means comprising a bridge carried in fixed position on said mold arm and a lockdown clip carried beneath said bridge for rotation selectively to overlie said ledge,
   at least one coolant passage in each of said mold parts having an inlet and an outlet disposed adjacent to each other at one end of said mold part,
   a coolant manifold carried by each said arm adjacent to said one end of said at least one mold part, said manifold having inlet and outlet coolant flow passages coupled to said inlet and said outlet of said at least one mold part,
   a coolant source and a coolant return disposed in fixed position adjacent to said arms, and
   pivotal coupling means operatively connecting said coolant source and return to said manifold, said pivotal coupling means including parallel coolant flow paths for directing coolant from said source through said pivotal coupling means and said manifold inlet passage to said mold inlet, through said mold part, and from said mold outlet through said manifold outlet passage and said pivotal coupling means to said coolant return.

30. A system for cooling molds in a glassware forming machine, which comprises:
   a pair of mold arms mounted for movement toward and away from each other,
   at least one mold part carried by each said arm and adapted to cooperate with each other to form a glassware mold,
   each of said mold parts including at least one coolant passage having an inlet and an outlet adjacent to each other at one end of said mold part,
   a coolant manifold carried by each said arm adjacent to said one end of said at least one mold part, said manifold having inlet and outlet coolant flow passages coupled to said inlet and said outlet of said at least one mold part,
   a coolant source and a coolant return disposed in fixed position adjacent to said arms, and
   pivotal coupling means operatively connecting said coolant source and return to said manifold, said pivotal coupling means including parallel coolant flow paths for directing coolant from said source through said pivotal coupling means and said manifold inlet passage to said mold inlet, through said mold part, and from said mold outlet through said manifold outlet passage and said pivotal coupling means to said coolant return,
   said pivotal coupling means including a tie shaft coupled to said manifold and having a first axis, a crank shaft coupled to said coolant source and return and having a second axis, and means operatively coupling said tie shaft to said crank shaft such that said tie shaft and said crank shaft are free to rotate about said first and second axes and coolant is free to flow through said tie shaft, said crank shaft and said coupling means to and from said manifold,
   said inlet and outlet of said coolant passages in said at least one mold part opening at an axial end of said mold part, said at least one mold part being mounted on end on said manifold, and said inlet and outlet coolant flow paths in said manifold opening upwardly into said mold part.

31. The system set forth in claim 30 wherein there are sealing means surrounding said inlet and outlet flow passages between said manifold and said mold part, and wherein said mold part is secured to said manifold in such a way as to permit limited relative movement between said mold part and said manifold as said mold arms open and close said mold parts while maintaining sealing engagement at said sealing means between said manifold and said mold part.

32. The system set forth in claim 30 wherein said coupling means comprises a second crank shaft having a third axis, a crank tie bar coupling said second crank shaft to said first crank shaft, and a shaft link block coupling said second crank shaft to said tie shaft such that said second crank shaft is free to rotate about said third axis and coolant is free to flow through said first crank shaft, said crank tie bar, said second crank shaft, said shaft link block and said tie shaft to and from said manifold.

33. The system set forth in claim 32 wherein said crank tie bar receives a first end of said first crank shaft and a second end of said second crank shaft,
   wherein said shaft link block receives a second end of said second crank shaft and a first end of said tie shaft, and
   wherein said parallel coolant flow paths comprise parallel source and return flow passages through said first crank shaft opening laterally into said crank tie bar, parallel source and return flow passages in said second crank shaft opening laterally into said shaft tie block at said second end of said second crank shaft, parallel source and return flow passages in said shaft link block, and parallel source and return flow passages in said tie shaft opening laterally into said shaft link block at said first end of said tie shaft.

34. The system set forth in claim 30 wherein said coupling means includes seals between said coupling means and said tie shaft and said first crank shaft, and means for draining coolant that leaks past said seals.

35. The system set forth in claim 34 wherein said draining means comprises coolant drain passages in said first crank shaft and said coupling means for returning to said coolant return any coolant that leaks past said seals.

36. The system set forth in claim 35 further comprising means for monitoring coolant return that leaks past said seals.

37. The system set forth in claim 35 wherein said parallel coolant flow paths comprise parallel source and return flow passages through said first crank shaft opening laterally into said coupling means, parallel source and return flow passages through said coupling means, and parallel source and return flow passages through said tie shaft,
   wherein said seals comprise annular seals in said coupling means slidably engaging said first crank shaft and said tie shaft and sealing said source and return flow passages from each other and from ambient, and
   wherein said coolant drain passages in said coupling means open between said annular seals at both of said shafts.

38. The system set forth in claim 30 wherein said manifold has a top on which said at least one mold part is mounted and a side to which said tie shaft is coupled.

39. The system set forth in claim 38 wherein said tie shaft has a head with laterally opening source and return flow passages, wherein there are seals between said head and said manifold surrounding said laterally opening source and return flow passages, and wherein said tie shaft head is secured to said side of said manifold in such a way as to permit limited relative movement between said manifold and said tie bar head as said mold arms open and close said mold parts while maintaining sealing engagement at said seals between said head and said manifold.

* * * * *